Sept. 24, 1935.　　　C. P. DEIBEL　　　2,015,379

DRY CELL AND SEAL THEREFOR

Filed June 19, 1934

INVENTOR.
Cyril P. Deibel
BY *Hull, Brock & West*
ATTORNEY.

Patented Sept. 24, 1935

2,015,379

UNITED STATES PATENT OFFICE 2,015,379

DRY CELL AND SEAL THEREFOR

Cyril P. Deibel, Lakewood, Ohio

Application June 19, 1934, Serial No. 731,320

3 Claims. (Cl. 136—133)

This invention relates generally to primary galvanic cells, especially cells usually referred to as dry cells. One of the main objects of this invention is to provide a dry cell of the character described which is provided with a seal capable of effectively excluding air from the interior of the cell and yet permitting excessive gas pressure within the cell to be relieved.

Another object of the invention is to provide a dry cell having two seals, the inner one of which is formed of sealing compound material which bonds with both the metal container and the carbon electrode and the outer one of which consists of a closure preferably formed of metal and which is mechanically connected to the container and surrounds the carbon electrode and is spaced therefrom, in combination with a metal cap covering the upper end of the carbon electrode.

A still further object of the invention is to provide a dry cell of the character described which consists essentially of a metal container and in which is arranged a mass of depolarizing mix and a carbon electrode which is insulated therefrom, together with a seal for the cell comprising an inner seal of sealing compound bonded with the walls of the container and with the carbon electrode, and an outer seal which consists of a metal cap mechanically secured to the container and surrounding the carbon electrode but spaced therefrom, the inner edges of the opening in the metal cap being deflected inwardly and embedded in the sealing material in combination with a metal cap which covers the exposed end of the carbon electrode and which is also embedded in the sealing material.

Figure 1:
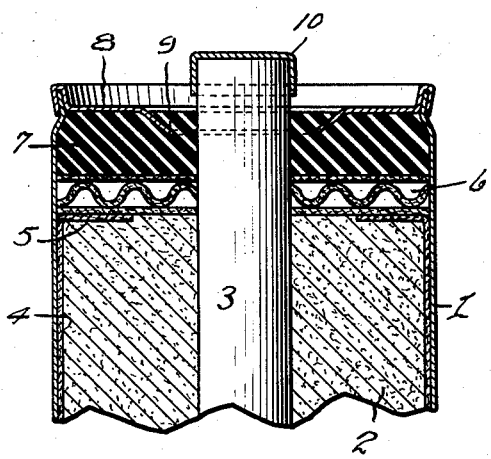
Figure 2:
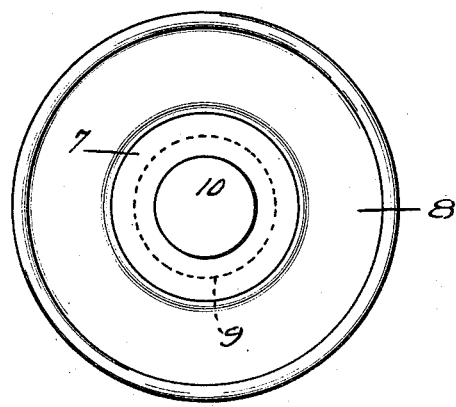

Further and more limited objects of the invention will appear as the description proceeds and by reference to the accompanying drawing in which Fig. 1 is a central vertical sectional view through a dry cell provided with my improved seal; Fig. 2 is a top plan view of such cell; and Fig. 3 is a view similar to Fig. 1 disclosing a slightly modified form of the invention.

Referring now to the drawing, the cell consists of a metal can or container 1 which is preferably cylindrical in shape and in which is arranged a mass of mix 2 and a carbon electrode 3. The mass of mix is insulated from the container by means of a suitable liner 4, the upper ends of which are folded over the top of the mass of mix as shown at 5. The carbon electrode 3 is positioned centrally of the mass of mix and extends thereabove a considerable distance. Surrounding the carbon electrode and resting on the mass of mix is a corrugated pad or disk 6 which is preferably formed of paper. Closing the upper end of the cell is a layer of sealing material 7 which is formed of a suitable sealing compound such as asphalt or other material which will bond with the sides of the metal container and also with the carbon electrode. Closing the top of the container is a metal cover 8 which is preferably circular in shape and mechanically secured to the upper edge of the container 1. The disk or cover 8 is provided with a central opening 9 the edges of which are deflected inwardly and embedded in the mass of sealing material. The upper end of the carbon electrode projects through the opening in the metal cover 8 and secured thereover is a metal cap 10. The layer of sealing material 7, and the corrugated disk 6 serve to effectively prevent the moisture from within the cell attacking or corroding the metal cover 8. The cover 8 may, if desired, be formed of some suitable composition, such as fibre or "Bakelite." If this cover is formed of such material, the seal 7 and corrugated disk 6 prevent the moisture from attacking the fibre which would cause it to swell. The inner edges of the central opening in the disk or cover 8 being deflected downwardly and embedded in the layer of sealing material 7 provide an effective support and strengthening means for the central portion of the cover. The carbon electrode is preferably impregnated with a waterproofing material but is sufficiently porous to permit the excessive gas pressure within the cell to be relieved therethrough.

Figure 3:
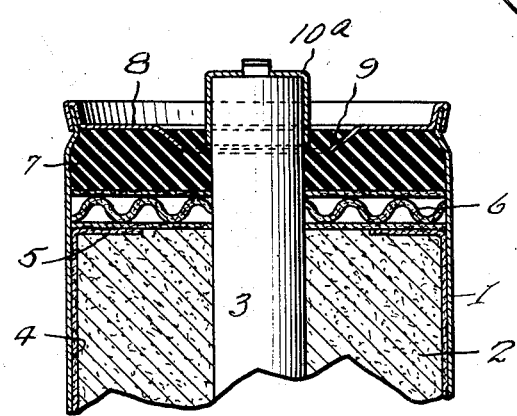

In Fig. 3 I have disclosed a modified form of cell in which the cap 10 is replaced by an apertured cap 10a which extends downwardly and is embedded in the layer of sealing material. In other respects, this form of cell is identical with that shown in Figs. 1 and 2.

This invention is applicable also to cells generally known as "six-inch cells". Cells of this type employ a central carbon electrode to the upper end of which is secured either a metal cap or a dowel pin which is well known to those skilled in the art.

In instances where the lower end of the cap is embedded in the layer of sealing material, the excessive gas pressure may be relieved through the aperture therein. This provides a very small vent for the gas to escape and yet prevents the ingress of outside air into the cell.

It will now be clear that I have provided a dry cell and seal which will accomplish the objects of the invention as hereinbefore stated. It is to be understood that the embodiments of the invention herein disclosed are merely illustrative and are not to be considered in a limiting sense as various changes may be made without departing from the spirit of the invention and the invention is limited only in accordance with the scope of the appended claims.

Having thus described my invention, what I claim is:

1. A dry cell comprising a metal container, a mass of depolarizing mix and an electrode arranged within said container and insulated therefrom, a layer of sealing material covering the said mass of mix and bonded with said container and electrode, a metal cover plate mechanically fastened to the upper end of said container and extending over said mass of mix and having an opening therein through which the electrode extends, the edges of said opening being deflected inwardly and embedded in said layer of sealing material.

2. A dry cell comprising a metal container, a mass of depolarizing mix and an electrode arranged within said container and insulated therefrom, a layer of sealing material covering the said mass of mix and bonded with said container and electrode, a metal cover plate mechanically fastened to the upper end of said container and extending over said mass of mix and having an opening therein through which the electrode extends, the edges of said opening being deflected inwardly and embedded in said layer of sealing material, and an insulating disk disposed inwardly of said layer of sealing material and surrounding said electrode and serving to position the same with respect to the opening in said cover plate.

3. A dry cell comprising a metal container, a mass of depolarizing mix and an electrode arranged within said container and insulated therefrom, a layer of sealing material covering the said mass of mix and bonded with said container and electrode, a metal cover plate mechanically fastened to the upper end of said container and extending over said mass of mix and having an opening therein through which the electrode extends, the edges of said opening being deflected inwardly and embedded in said layer of sealing material, an insulating disk disposed inwardly of said layer of sealing material and surrounding said electrode and serving to position the same with respect to the opening in said cover plate, and a metal cap secured over said electrode and having its lower edges embedded in said layer of sealing material.

CYRIL P. DEIBEL.